April 4, 1944.  F. E. ALTMAN  2,346,062
LENSES
Filed June 5, 1942
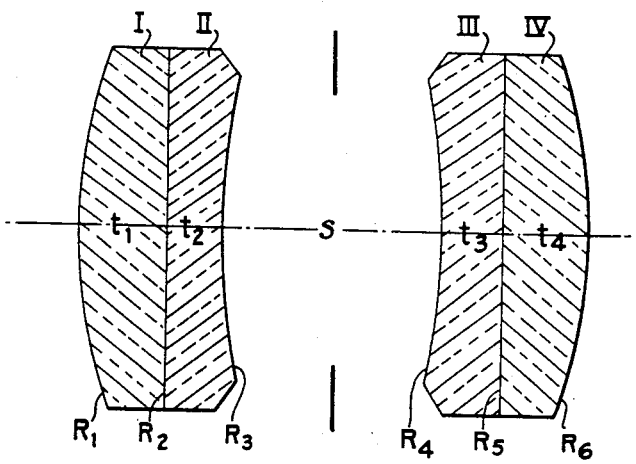
| f = 100 mm. | | f/8 | COVERING POWER 21° |
|---|---|---|---|
| LENS | $N_D$ | V | RADII | THICKNESSES |
| I | 1.744 | 45.8 | $R_1$ = +62.7 mm. | $t_1$ = 11.1 mm. |
|   |       |      | $R_2$ = ∞         | $t_2$ = 7.4 |
| II | 1.649 | 33.8 | $R_3$ = +101.2   |             |
|    |       |      |                    | S = 27.8 |
| III | 1.649 | 33.8 | $R_4$ = -101.2  | $t_3$ = 7.4 |
|     |       |      | $R_5$ = ∞        | $t_4$ = 11.1 |
| IV | 1.744 | 45.8 | $R_6$ = -62.7   |              |
FRED E. ALTMAN
INVENTOR
BY
ATTY & AG'T Patented Apr. 4, 1944

2,346,062

UNITED STATES PATENT OFFICE 2,346,062

LENS

Fred E. Altman, Rochester, N. Y., assignor to Eastman Kodak Company, Rochester, N. Y., a corporation of New Jersey Application June 5, 1942, Serial No. 445,856

4 Claims. (Cl. 88—57)

This invention relates to lenses and particularly to the well known type of lenses which consists of two components more or less symmetrically arranged about a diaphragm. In simple periscopic lenses each of these components is a single element, but the present invention relates more specifically to those forms in which each component is compound.

It is the object of the invention to provide a lens of this type covering out to 21° or more from the axis with an extremely flat field, with freedom from spherical aberration and especially with freedom from lateral color at the edges of the field. Ordinarily, longitudinal color (chromatic aberration) is also corrected and if the lens is made completely symmetrical as in the preferred embodiment of the invention, all coma is of course entirely eliminated.

A lens according to this invention has proven to be especially valuable when made up in about 5 mm. focal length for use in a gastroscope camera.

According to the invention, a lens of this type consists of two compound meniscus components concave toward a diaphragm therebetween, each component including a positive element whose index of refraction is greater than 1.7 and all of the elements of the objective having indices of refraction greater than 1.62. Preferably each component is a doublet and the two doublets are symmetrically arranged about the diaphragm with the positive element in each doublet cemented to the outside of a negative element. The positive element in each component should have a dispersive index greater than 35.

The drawing shows:

The preferred embodiment of the invention.

The specifications for this preferred embodiment are as follows:

| f=100 mm. | | f/8 | Covering power 21° | |
|---|---|---|---|---|
| Lens | $N_D$ | V | Radii | Thicknesses |
| I | 1.744 | 45.8 | $R_1=+62.7$ mm. $R_2=\infty$ | $t_1=11.1$ mm. $t_2=7.4$ |
| II | 1.649 | 33.8 | $R_3=+101.2°$ | $S=27.8$ |
| III | 1.649 | 33.8 | $R_4=-101.2$ $R_5=\infty$ | $t_3=7.4$ $t_4=11.1$ |
| IV | 1.744 | 45.8 | $R_6=-62.7$ | |

The above specifications are given for 100 mm.

focal length as required for comparison with prior systems, but the actual lens may be made up in any focal length. In a gastroscope camera, such a lens in 5 mm. focal length is especially useful. For this latter purpose, the most preferred embodiment has the lens symmetrical with each component containing only two elements, but, of course, the invention can be equally applied to all lenses of this class which has two compound menisci concave toward each other As my invention, I claim:

1. A photographic objective consisting of two compound meniscus components concave toward a diaphragm therebetween, each component including a positive element whose index of refraction is greater than 1.7 and all of the elements in the objective having indices of refraction greater than 1.62, in which each of the concave surfaces facing the diaphragm has a radius of curvature about equal to the focal length of the objective and greater than the radius of either of the outer surfaces of the objective.

2. An objective according to claim 1 which consists of two symmetrical doublets with said positive element in each cemented to the outside of a negative element.

3. An objective according to claim 1 in which said positive element in each component has a dispersive index greater than 35.

4. A photographic objective having approximately the following specifications:

| Lens | $N_D$ | V | Radii | Thicknesses |
|---|---|---|---|---|
| I | 1.75 | 45 | $R_1=+.6F$ | $t_1=.1F$ |
| II | 1.65 | 35 | $R_2=\infty$ $R_3=+F$ | $t_2=.07F$ $S=.25F$ |
| III | 1.65 | 35 | $R_4=-F$ $R_5=\infty$ | $t_3=.07F$ |
| IV | 1.75 | 45 | $R_6=-.6F$ | $t_4=.1F$ | where Roman numerals refer to lens elements from front to rear, $N_D$ is the index of refraction for the D line of the spectrum, V is the dispersive index, $R_1$ to $R_6$ are respectively the radii of curvature of the refractive surfaces from front to rear, + and − signs refer respectively to surfaces convex and concave to the front, $t_1$ to $t_4$ are the axial thicknesses of the elements, S is the air space thickness and F is the focal length of the objective.

FRED E. ALTMAN.